US009090408B2

(12) United States Patent
Hahn et al.

(10) Patent No.: US 9,090,408 B2
(45) Date of Patent: Jul. 28, 2015

(54) APPARATUS AND METHOD OF CONVEYING CONTAINERS WITH BASE GUIDANCE (75) Inventors: Wolfgang Hahn, Neutraubling (DE); Roland Laumer, Regensburg (DE)

(73) Assignee: KRONES AG (DE)

( * ) Notice: Subject to any disclaimer, the term of this patent is extended or adjusted under 35 U.S.C. 154(b) by 355 days.

(21) Appl. No.: 12/957,586

(22) Filed: Dec. 1, 2010

(65) Prior Publication Data
US 2011/0138613 A1 Jun. 16, 2011

(30) Foreign Application Priority Data

Dec. 14, 2009 (DE) .......................... 10 2009 058 084

(51) Int. Cl.
*B65G 29/00* (2006.01)
*B65G 47/86* (2006.01)

(52) U.S. Cl.
CPC ......... *B65G 47/847* (2013.01); *Y10T 29/53543* (2015.01)

(58) Field of Classification Search
CPC ...... B67C 7/004; B67C 7/0006; B65C 9/065; B65G 47/24; B65G 47/847
USPC .............. 29/429, 798, 453; 198/345.1, 418.7, 198/458, 480.1, 680, 836.1; 206/427, 434
See application file for complete search history.

(56) References Cited

U.S. PATENT DOCUMENTS

| | | | | |
|---|---|---|---|---|
| 3,934,714 A | * | 1/1976 | Matsumoto | 198/379 |
| 3,990,316 A | * | 11/1976 | Risi | 74/24 |
| 4,428,474 A | * | 1/1984 | Gau et al. | 198/394 |
| 4,511,025 A | * | 4/1985 | Nakayama | 198/377.08 |
| 5,326,422 A | * | 7/1994 | Kronseder | 156/566 |
| 5,337,794 A | * | 8/1994 | Nishiyama et al. | 141/144 |
| 6,398,006 B1 | * | 6/2002 | Dault | 198/377.01 |
| 7,731,022 B2 | * | 6/2010 | Zepf | 198/860.1 |
| 2003/0106799 A1 | | 6/2003 | Covington et al. | 204/600 |
| 2009/0211881 A1 | * | 8/2009 | Braun et al. | 198/678.1 |
| 2010/0136159 A1 | * | 6/2010 | Bernhard | 425/534 |

FOREIGN PATENT DOCUMENTS

| | | | | |
|---|---|---|---|---|
| DE | 2736206 | | 2/1979 | ............... B67C 3/22 |
| DE | 2806080 | | 5/1979 | ............... B67C 1/04 |
| DE | 93 10 905 | | 3/1994 | ............... B65G 47/84 |
| DE | 4332327 | | 3/1995 | ............... B67C 3/24 |
| DE | 10 2006 055 317 | | 5/2005 | ............... B65G 47/32 |
| DE | 20 2005 002 469 | | 5/2005 | ............. B65B 59/00 |
| DE | 102005041120 | | 3/2007 | ............. B65B 59/00 |

(Continued)

OTHER PUBLICATIONS

German Search Report dated Dec. 14, 2009, 4 pgs.

(Continued)

*Primary Examiner* — Minh Trinh
(74) *Attorney, Agent, or Firm* — Hayes Soloway P.C.

(57) ABSTRACT

An apparatus for conveying containers with a guiding element which contacts the container in at least one area of the peripheral wall thereof and guides the container on a pre-set path, with a driving device which drives the guiding element in order to convey the container, and with a base support element which supports the container at least in part during the conveying in a base region of the container. According to the invention the base support element is vertically displaceable.

15 Claims, 4 Drawing Sheets

(56) References Cited

FOREIGN PATENT DOCUMENTS

| | | | | |
|---|---|---|---|---|
| DE | 102005042275 | 3/2007 | ................ | B67C 7/00 |
| DE | 10 2008 0 10 895 | 8/2009 | ............ | B65G 47/84 |
| DE | 102008037101 | 2/2010 | ............ | B65B 59/00 |
| EP | 0382161 | 8/1990 | ................ | B67B 1/04 |
| EP | 1495973 | 1/2005 | ............ | B65B 35/58 |
| EP | 1495973 A1 * | 1/2005 | ............ | B65B 35/58 |
| EP | 1 663 824 | 6/2006 | | |
| EP | 1663824 A2 * | 6/2006 | ............ | B65G 47/84 |
| EP | 2186759 | 5/2010 | ............ | B65G 47/84 |
| EP | 2186759 A1 * | 5/2010 | ............ | B65G 47/84 |
| JP | 2005145477 | 6/2005 | ................ | B67B 3/02 |
| JP | 2007-0 55 703 | 3/2007 | ............ | B65G 47/84 |
| JP | 2009046224 | 3/2009 | ............ | B65G 47/84 |
| WO | WO 0162636 | 8/2001 | ............ | B65G 47/84 |
| WO | WO 2004014779 | 2/2004 | ................ | B67C 3/20 |
| WO | WO 2005/030616 | 4/2005 | ............ | B65G 29/00 |

OTHER PUBLICATIONS

Chinese Office Action for corresponding application No. 2010105873970, dated Oct. 24, 2011 (10 pgs).

Chinese Office Action issued for 2010105873970, dated Jul. 18, 2012 (7 pgs).

European Search Report (8 pgs), Mar. 28, 2011.

* cited by examiner

APPARATUS AND METHOD OF CONVEYING CONTAINERS WITH BASE GUIDANCE

FIELD OF THE INVENTION

The present invention relates to an apparatus for conveying containers.

BACKGROUND OF THE INVENTION

It has long been known in the beverage-producing industry that the beverage containers to be produced are subjected to various treatment steps, such as for example blow-moulding shaping in which plastics-material preforms are shaped to form plastics-material containers, sterilization procedures, filling procedures, closure procedures and also labelling procedures. In this case the beverage containers are usually guided separately. Different divisions are frequently provided in a manner dependent upon the respective treatment procedure. In the case of a block arrangement with post-labelling, i.e. labelling of the bottle already filled and closed, it is usual in the prior art for a screw-type block arrangement to be used. In this case the screw is used for the division delay, since a larger division is usually used in the labelling machine than in the filling machine. The drawback of this procedure is that, in the event of changes to the bottle, size parts are necessary or size parts have to be changed.

In addition, continuous conveying of the bottle on the carrier ring is frequently not possible. In particular, when the bottle has already been closed with a closure, it is only possible to guide the bottle with a gripping element which engages below the carrier ring, since the space above the carrier ring is covered by the closure. Closed bottles can therefore be transferred from one gripping element to a further one only with difficulty, since when the bottles are still open the gripping elements engage alternately above and below the aforesaid carrier ring.

In this case, other conveying devices such as conventional conveyor belts have the drawback that in the case of containers of different height the apertures are situated at different heights and it therefore becomes difficult to take them over by further gripping clamps.

The object of the present invention is therefore to make available a conveying device for containers which can be adapted to different container heights in a simple manner and which therefore allows widely varying containers and container shapes to be conveyed. In particular, it should also be made possible for containers to be conveyed in a manner independently of their height so that the height level of the aperture of the containers remains constant.

SUMMARY OF THE INVENTION

An apparatus according to the invention for conveying containers has a guiding element which contacts the container in at least one area of the peripheral wall thereof and guides the container on a pre-set path. In addition, a driving device is provided which drives the guiding element in order to convey the container. In addition, a base support element is provided which supports the container at least in part during the conveying in a base region of the container. According to the invention the base support element is vertically adjustable.

It is therefore proposed that the guiding element should move the container, but in this case it is the base of the container that is supported. It is thus preferable for the containers not to be gripped below the carrying ring for example during the conveying of the containers. It is particularly preferred for the base support element to perform the task of preventing the container from slipping in the longitudinal direction thereof. On account of the vertical adjustability of the base support element, i.e. in particular the adjustability of the base support element in a longitudinal direction of the container, it is possible for containers of different height to be guided without the height or the conveying height of the apertures of the containers having to be changed in this case. This is advantageous since the containers are usually transferred at a specific height from preceding or possibly also following conveying devices and, in this way, it is not necessary for this height to be changed when adaptation to different container heights is to take place.

In the case of an advantageous embodiment the apparatus has a driving element, by means of which the vertical adjustment of the base support element can be carried out In this way it is possible for the vertical adjustment of the base support element to be changed in a specific change-over operation. Plants of this type usually have a plurality of guiding elements for guiding a plurality of containers. In this case it would be possible for a base support element also to be associated with each guiding element, but it would also be possible in a preferred manner for a base support element to be used for supporting all the containers.

In this case it is advantageously possible for a movement of the driving element 7 to be capable of being coupled to a movement of the driving device 8. In this way, in a special change-over operation, the servo motor of a star-type column, which is used for driving the guiding elements, can also for example be operated in particular in order to drive the vertical adjustment. In this case the driving element can be for example a toothed wheel or the like which actuates a spindle drive for the vertical adjustment. It is thus possible for a coupling to engage in the context of a product change and for a drive for the base support element to be set in such a way that the base support element is moved to the desired container height.

It is advantageous for a further element, such as for example a push-on plate for pushing the containers onto a further conveying device, to be vertically adjustable with the base support element.

It would also be possible, however, for the driving device to be an electric motor and, in particular, a servo motor, with the aid of which the vertical adjustment is carried out.

In the case of an advantageous embodiment the base support element is arranged stationary in the conveying direction of the container. This means that the base support element is associated with all the guiding elements and each container is thus displaced along its conveying path with respect to the base support element. In the case of a further advantageous embodiment the apparatus has a second guiding element which is different from the first guiding element and is preferably also separate therefrom and which guides the containers during the conveying thereof. This can be for example a circular segmental wall which supports the containers during the conveying thereof by the first guiding elements.

In this case it is advantageous for the position of the second guiding element to be capable of being changed, in particular with respect to the first guiding element. In this way, a change-over to different cross-sections of different containers can be carried out. In this case it is advantageous for the position of the second guiding element to be displaceable, in particular in a radial direction, and in particular when the containers are guided on a circular path.

It is therefore advantageous for the conveying apparatus to be designed in such a way that no conveying elements are in the immediate vicinity of a carrier ring of the containers to be conveyed.

It is particularly preferred for the second guiding element to be arranged in a stationary manner so that, as mentioned, a stationary wall for example can be involved, against which the containers are pressed during the conveying thereof.

In the case of a further advantageous embodiment the first guiding element has a receiving pocket which contacts the container on its external periphery during the conveying thereof. In this way, for example, the guiding element can have two guide parts or jaws which contact the container from two different directions. In cooperation with the second guiding device in particular, conveying of the containers by the receiving pocket can be carried out in this way.

It is advantageous for these guiding elements also to permit a separate conveying of the containers.

In the case of a further advantageous embodiment at least one guiding element has variable receiving cross-section for receiving the containers. It is thus possible for two guide parts to change their mutual distance from each other and/or for the second guiding element also to be moved so as to be able to receive different receiving cross-sections of containers in this way. It is advantageous for the apparatus to have at least one setting device in order to change the receiving cross-section of at least two guiding elements. In this case, in particular, it is possible for the receiving cross-section of the two guiding elements to be changed at the same time. It is particularly preferred for the setting device to have the effect that the receiving cross-sections of all the guiding elements are changed substantially at the same time, so that an automatic change-over to different container cross-sections can be carried out.

In the case of a further advantageous embodiment the apparatus has a plurality of first guiding elements. It is particularly preferable for at least one first guiding element and, in a particularly preferred manner, for all the first guiding elements to be arranged on a rotatable carrier. In this case therefore, all the guiding elements are guided along a circular path. It would also be possible, however, for the guiding elements to be arranged for example on a circulating chain or the like.

In addition, the present invention relates to a plant for the treatment of containers which comprises a closure device for closing the containers with closures and an apparatus arranged downstream of the closure device in the conveying direction of the containers for conveying the containers of the type described above.

As mentioned above, the invention can be applied with particular advantage to the conveying of closed containers, since the latter can still be gripped only below the carrier ring and in this way a transfer from one gripping clamp to a further gripping clamp is made difficult.

It is advantageous for the plant to have a device for labelling the containers. It is advantageous for this device for labelling the containers to be arranged downstream of the aforesaid conveying apparatus. In addition a further conveying device, such as in particular a conveyor belt, can also be arranged downstream of the conveying apparatus. In this case a transfer path can be provided which guides the containers from the conveying apparatus according to the invention to the following conveyor belt. It is also preferably possible in this case for this transfer path or transfer plate—preferably jointly with or in a manner coupled to the base support element—to be vertically adjustable.

A novel bottle outlet from a plant is therefore also proposed. This is, as described above, advantageously a recessed star which is intended to convey the bottles instead of a chute. This recessed star engages the bottles below the neck ring, in particular in a region of the body of the bottle. In this way, different sizes and shapes of bottles can be conveyed with this recessed star A belt, which pushes the bottles at the closure or thread onto a vertically adjustable conveyor belt, could thus be attached to this recessed star.

The present invention further relates to a method of conveying containers, in which the containers are conveyed by means of a driven guiding element along a pre-set conveying path, and over this conveying path a base portion of the containers is supported by means of a base support element at least temporarily. In this case, in particular during change-over operation, the base support element is changed according to the invention to different dimensions with respect to the height thereof at least temporarily.

It is advantageous for the containers not to be gripped below a carrier ring thereof for example during the conveying. The containers are preferably plastics-material containers or plastics-material bottles. The invention can also, however, be applied to other containers such as for example glass bottles or even plastics-material preforms.

It is therefore advantageous for the change in the height of the base support element to be carried out in order to adapt the apparatus to different heights of the containers.

In a further preferred method the containers are conveyed on a circular path. It is advantageous for the height of the base support element to be maintained during the conveying of the container. In this case all the containers are advantageously supported with the same base support element and move in each case over equal areas of the same base support element. It is advantageous for the containers to be plastics-material containers.

In the case of a further advantageous method the containers are guided separately. It is particularly preferred for the containers to be guided at least from two sides in each case. It is advantageous for the containers to be contacted at at least three different areas in the peripheral direction during the conveying thereof.

BRIEF DESCRIPTION OF THE DRAWINGS

Further advantages and embodiments may be seen in the accompanying drawings. In the drawings

DETAILED DESCRIPTION OF THE DRAWINGS

Figure 1:
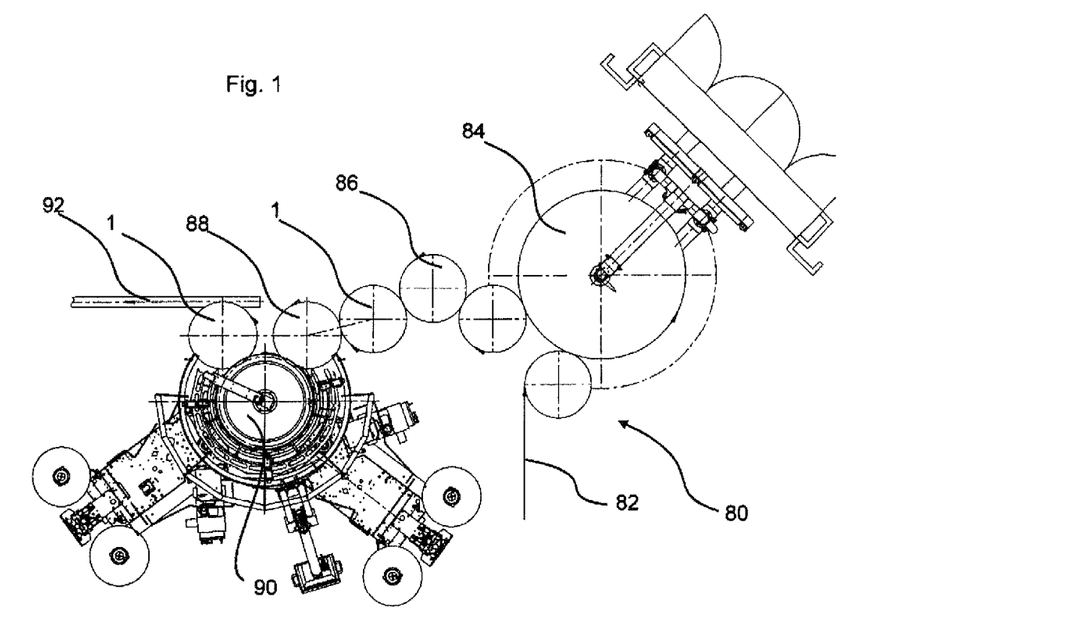
FIG. 1 is a diagrammatic illustration of a plant for the treatment of containers.

FIG. 1 is a diagrammatic illustration of a plant 80 according to the invention for the treatment of containers. In this case the reference number 82 designates an inlet which first supplies the containers to a filling device 84. Downstream of the filling device the filled containers are guided by way of a closing means 86 and they are closed there with closures. After this time the containers can usually be gripped only below the carrier ring. The reference number 1 designates a conveying apparatus in which case a conveying apparatus according to the invention can be used at this point. A so-called base-handling of the containers takes place in this region, i.e. the containers are supported at their base here.

The reference number 88 designates a division delay star, in which case it is again advantageous for neck handling to take place, i.e. the containers are held below the carrier ring. The reference number 90 designates in its entirety a labelling machine which provides the containers with labels. An apparatus of the type according to the invention, which supports the containers at the base thereof, can be attached in turn in this labelling machine. The reference number 92 designates an outlet and, in particular, a belt outlet, by way of which the containers are brought out. It is therefore preferable for the containers already filled and closed to be labelled here.

Figure 2:
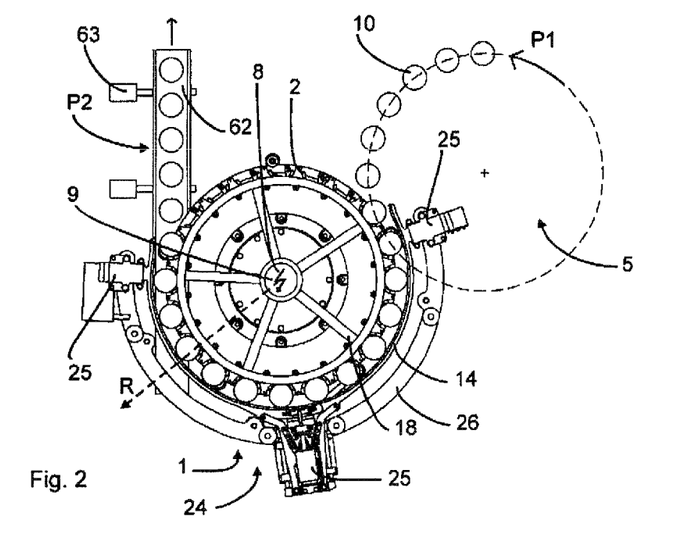
FIG. 2 is a diagrammatic illustration of an apparatus according to the invention.

FIG. 2 is a diagrammatic illustration of an apparatus according to the invention. In this case too it is again evident that containers 10 are first guided along the arrow P1 and are thus supplied to the apparatus 1. In this case the apparatus has a carrier wheel 18 which rotates in the clockwise direction in this case. The reference number 8 designates (only diagrammatically) a driving device which drives the carrier wheel 18. A plurality of first guiding elements or guiding devices 2, which take over the containers in this case, are provided on the carrier wheel 18, the guiding elements 2 being formed in this case in the manner of recesses so as to be able to receive the containers in this way.

The reference number 14 designates a further or second guiding device which in this case is designed in the form of a peripheral wall so that the containers 10 cannot slide outwards in the radial direction. In this way, the containers 10 are conveyed along the conveying path by the guiding elements 2 on the one hand and by the second guiding unit 14 on the other hand. The reference number 24 designates an adjusting device by which the second guiding device as a whole can be adjusted in the radial direction R. In this way, the apparatus can be adapted to different container diameters. The reference number 25 designates a corresponding drive for adjusting the guiding device 24. This can be for example a pneumatic or even an hydraulic drive, but electric-motor drives, however, would also be possible.

The reference number 26 designates a carrier element with a circular-segmental cross-section which is used to fasten the guiding device 14. In this case this carrier element 26 advantageously has the effect that the guiding device 14 moves in the peripheral direction in a uniform manner in the radial direction.

The containers are moved out by way of a container outlet 62, it being possible for this to be a conveyor belt for example. In this case the entire apparatus 1 has a vertically adjustable star-type column. The device 5 can likewise in this case be a conveying device, but also for example a container-treatment machine such as for example a closing means. In this case the carrier device 18 is, as mentioned, designed in the form of a star-type column with a star-type receiving means. In this case, too, the conveying device or the container outlet 62 can have a railing guide adjustable by a motor in order to achieve an adjustment to different containers. The reference number 63 designates a drive to displace these railings in the direction of the arrow P2 in this case.

It is also possible for slip ring transducers for the electrical current supply and the signals or compressed air or even hydraulic liquid to be provided in the region of the drive 8.

Figure 3:
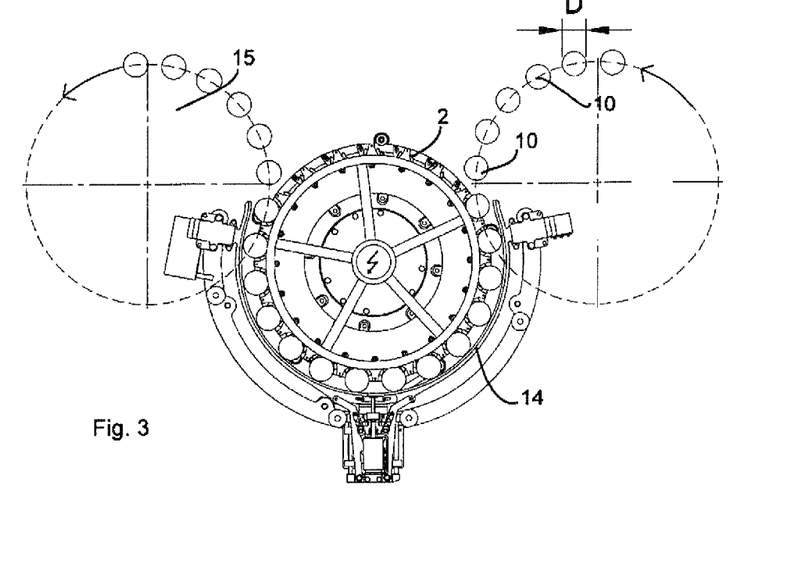
FIG. 3 is a diagrammatic illustration of an apparatus according to the invention in a further embodiment.

FIG. 3 is a further illustration of the apparatus shown in FIG. 2. In this case a further treatment unit 15 is additionally evident, which can also be for example a labelling machine. In the illustration shown in FIG. 3 the containers 10 have a specified pre-set diameter D.

Figure 4:
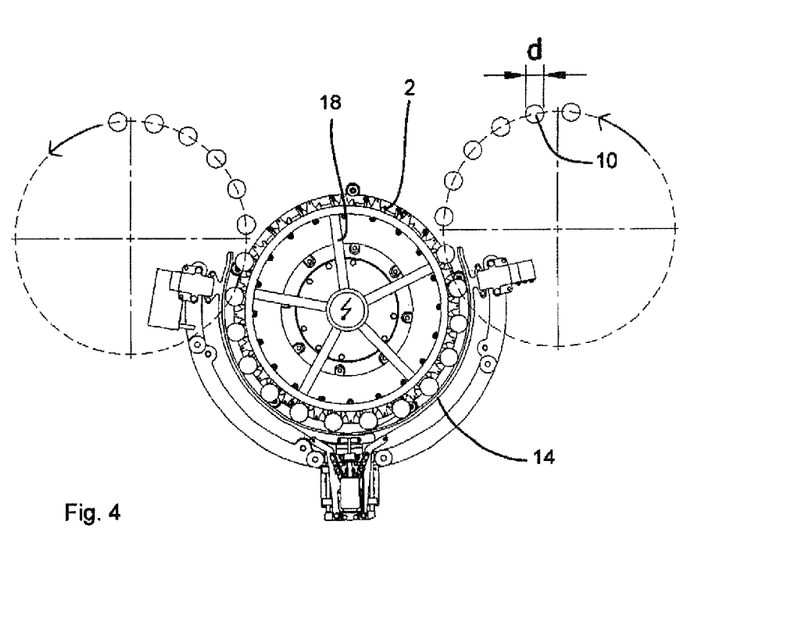
FIG. 4 shows the apparatus as shown in FIG. 3 in a modified arrangement.

FIG. 4 shows the apparatus from FIG. 3, which, however, has been changed over for containers 10 with a smaller diameter d. In this case the second guiding device 14 has been displaced in the radial direction closer to the carrier wheel 18 and also the individual guiding elements 2 have been changed over, as explained in more precise terms below, to a narrower container diameter d.

Figure 5:
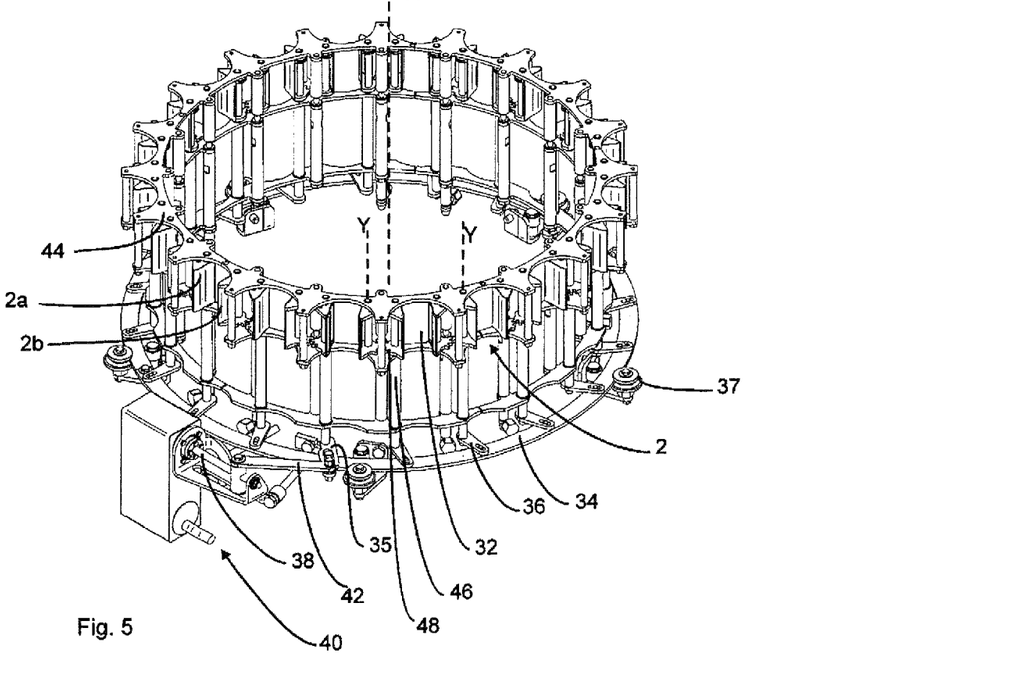
FIG. 5 is a perspective illustration of an apparatus according to the invention.

FIG. 5 is a perspective illustration of an apparatus 1 according to the invention. It is evident that this apparatus 1 has a plurality of guiding elements 2, these guiding elements 2 having in each case side parts or jaws 2a and 2b which co-operate in order to receive the containers. These side parts 2a and 2b are articulated in each case to a carrier 44, the pivot axes Y thereof extending parallel to a longitudinal direction of the containers and also to the axis of rotation of the carrier 44 as a whole.

The reference number 40 designates in its entirety an adjustment device to adjust the guiding elements to the different container diameters. In this case an hydraulic or pneumatic cylinder is provided which actuates a setting ring 34 by way of a linkage 35, 38 and 42, this setting ring having articulated to it a plurality of actuating arms 36 which are pivoted in this way. The individual side parts are pivoted by a movement of these actuating arms 36. The setting ring 34 is in turn guided by guiding rolls 37. The pivoting movement of the actuating arms 36 is transferred in each case to the guiding side parts 2a and 2b by way of rods 46. In this case a side part 2a of a first guiding element and a second side part 2b of an adjacent guiding element 2 are moved by the movement or rotation of one of these rods 46

Figure 6:
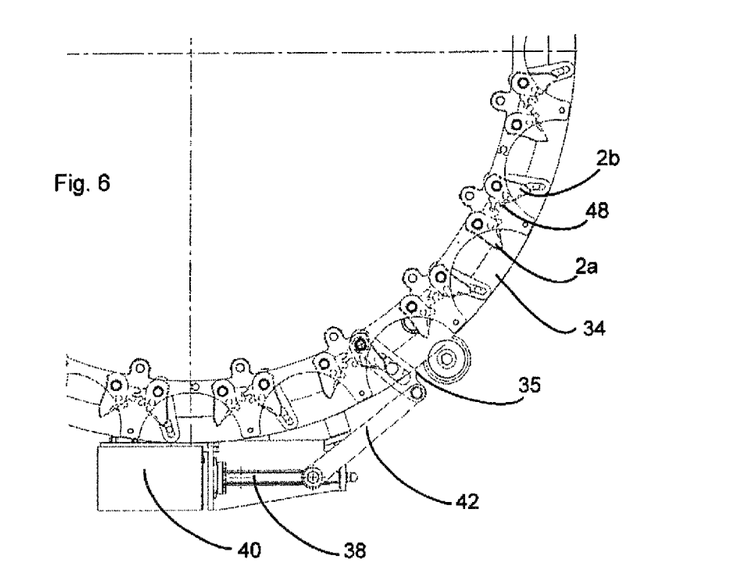
FIG. 6 is a plan view of the apparatus as shown in FIG. 5.

FIG. 6 is a plan view of a detail of the apparatus shown in FIG. 5. In this case a set of teeth 48 is evident, which couples two adjacent side parts 2a and 2b to each other. In this way, as shown in FIG. 6, it is possible for the lever 36 to be moved by a movement of the piston or the rod 38 and a movement of the transfer rod 42 coupled thereto. In this way the ring 34 is moved and thus all the actuating arms 36 are associated in their entirety with respective rods 46.

In this way a simultaneous pivoting of all the side parts 2a and 2b and thus a movement of all the guiding elements can be carried out. In this way, all the guiding elements can be adapted to new container diameters in a uniform manner. In this case the actuating rod 38 can also be designed in the form of a spindle and the drive 40 can be an electric motor for example. Both a continuous setting and a stepped setting of the guiding elements should be possible in this case.

Figure 7:
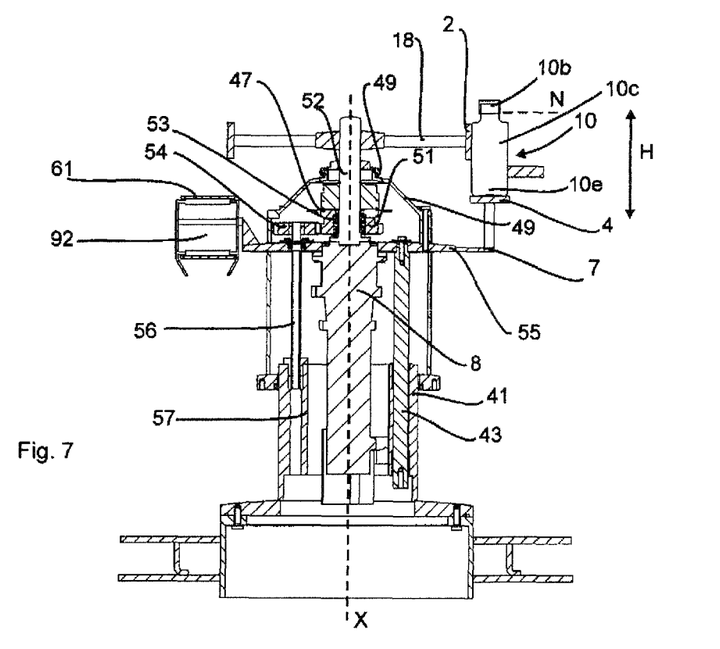
FIG. 7 is a sectional illustration of the apparatus as shown in FIG. 5.

FIG. 7 is a sectional illustration of an apparatus 1 according to the invention. In this case too the guiding elements 2 or guiding recesses are again evident, which are arranged on a carrier 18, this carrier being rotatable about the axis X with the aid of a shaft 52. In this case the reference number 4 again designates the base support element which, as mentioned above, is adjustable with respect to its height. The container 10 also has a closure 10b arranged on it, so that the container can be gripped only below the carrier ring if a neck handling is desired.

The reference number 8 designates a drive (not illustrated in detail) for the arrangement. The vertical adjustment is carried out by way of a first toothed wheel 51 and a second toothed wheel 54. The second toothed wheel 54 can be brought into engagement with the first toothed wheel 51 by way of a clutch 47, so that the vertical adjustment can take place. If a coupling of this type is present, a rotating spindle 56 which is arranged in a thread 57 is turned by way of the second toothed wheel 54. It is advantageous for two spindles of this type to be arranged on the partial circle of the apparatus. In addition, a rod 43 is provided which enters a corresponding recess 41 or guide for stabilization. In this case this rod or this guide pin 43 is likewise present twice on the partial circle.

The reference number 49 designates a seal between the rotating and the stationary part of the apparatus. In this case, for example, labyrinth seals or the like can be used. The reference letter N designates the height of the neck ring, which is to be kept constant in this case.

The conveying device or the conveyor belt 92 is pushed upwards or downwards jointly with the base support element 4. Expressed in more precise terms, a support area area or transfer area 61, onto which the container is pushed is likewise pushed upwards or downwards, as a result of which, as mentioned above, the height of the thread or the neck-ring height M can remain constant. The reference number 55 designates a carrier on which the base support element and in this case also the abutment face are situated.

Figure 8:
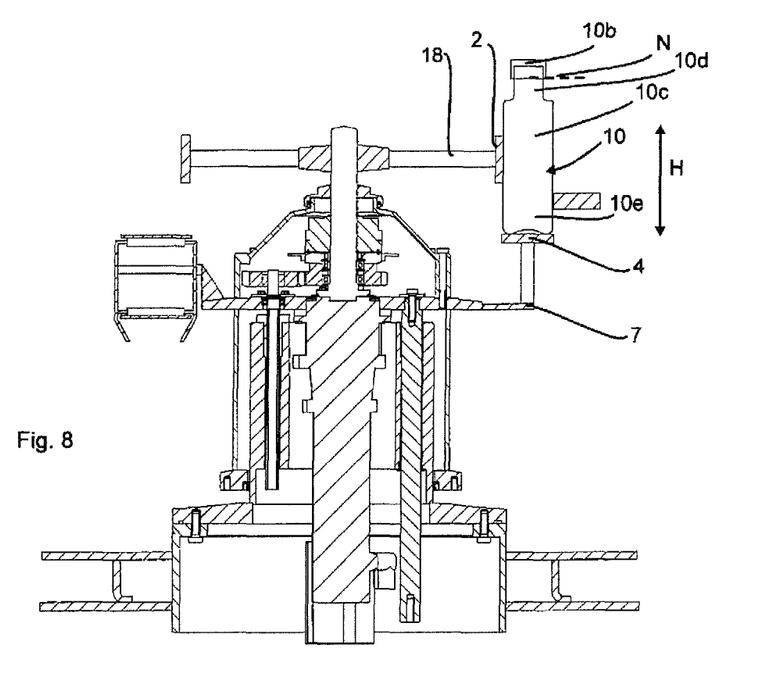
FIG. 8 is a sectional illustration in a modified operation.

FIG. 8 shows the apparatus from FIG. 7, in which case a relatively long container is to be gripped. It is evident that in this case the base support element 4 has been lowered and preferably also the guiding elements 2 with the base support element. These now rest further down against the middle region 10c of the container. This middle region extends between the base region and the neck region of the container 10. In this way the distance between the base support element 4 and the guiding element 2 does not change in the vertical direction H. It would also be possible in another embodiment however, for the distance between the two elements 2 and 4 to change in the vertical direction. It is evident that in this case the threaded spindle 56 has completely been inserted into the thread 57. The reference number 53 designates a mounting device for mounting the first gearwheel 51. It is evident that the guiding element contacts the containers in each case on the peripheral wall thereof between the neck region 10d and the base region 10e.

All the features disclosed in the application documents are claimed as being essential to the invention, insofar as they are novel either individually or in combination as compared with the prior art.

LIST OF REFERENCES 1 apparatus/conveying device
2 guiding element
2a, 2b side parts
4 base support element
5 device
7 driving element
8 driving device
10 containers
10b closure
10 c middle region
10d neck region of the container
10e base region of the container
14 guiding device
15 treatment unit
18 carrier wheel
25 drive
24, 40 adjustment device
26 adjustment device
34 setting ring
36 actuating arms
37 guiding rolls
35, 38, 42 linkage
40 adjustment device
41 recess
43 rod
44 carrier
46 rods
47 clutch
48 sets of teeth
49 seal
51 first gearwheel
52 shaft
53 mounting device
54 second gearwheel
56 threaded spindle
57 thread
61 support area
62 container outlet
63 drive
80 plant
82 inlet
84 filling device
86 closure means
88 division delay star
90 labelling machine
92 outlet/belt outlet
D, d diameter
H vertical direction
N height
P1, P2 arrow
Y pivot axis
X axis of rotation of the carrier
R radial direction

The invention claimed is:

1. An apparatus for conveying containers with a first guiding element which contacts the container in at least one area of the peripheral wall thereof and guides the container on a pre-set path, said apparatus comprising: a first driving device which drives the first guiding element to convey the container, and having a base support element for supporting the container by a base region of the container at least in part during the conveying, wherein the base support element is vertically displaceable, and wherein the apparatus has a second driving device, by which vertical adjustment of the base support element may be carried out, coupled to the first driving device via a clutch.

2. The apparatus according to claim 1, wherein the base support element is arranged stationary in a conveying direction of the containers.

3. The apparatus according to claim 1, wherein the apparatus has a second guiding element which is different from the first guiding element and which guides the containers during the conveying thereof.

4. The apparatus according to claim 3, wherein at least one of the first guiding element and the second guiding element has a variable receiving cross-section for receiving different diameter containers.

5. The apparatus according to claim 4, further including a drive for adjusting the at least one guiding element.

6. The apparatus according to claim 5, wherein the drive is selected from the group consisting of a pneumatic drive, an hydraulic drive and an electric-motor drive.

7. The apparatus according to claim 1, wherein the apparatus has a plurality of first guiding elements.

8. An apparatus for conveying containers with a first guiding element which contacts the container in at least one area of the peripheral wall thereof and guides the container on a pre-set path, said apparatus comprising: a first driving device which drives the first guiding element to convey the container, and having a base support element for supporting the container by a base region of the container at least in part during the conveying, wherein the base support element is vertically displaceable, and wherein the apparatus has a second driving device, by which vertical adjustment of the base support element may be carried out, coupled to the first driving device, wherein the vertical adjustment of the height of the base support element is carried out through a first and a second toothed wheel.

9. The apparatus according to claim 8, wherein the second toothed wheel is brought into engagement with the first toothed wheel via a clutch.

10. The apparatus according to claim 8, wherein the base support element is arranged stationary in a conveying direction of the containers.

11. The apparatus according to claim 8, wherein the apparatus has a second guiding element which is different from the first guiding element and which guides the containers during the conveying thereof.

12. The apparatus according to claim 11, wherein at least one of the first guiding element and the second guiding element has a variable receiving cross-section for receiving different diameter containers.

13. The apparatus according to claim 12, further including a drive for adjusting the at least one guiding element.

14. The apparatus according to claim 13, wherein the drive is selected from the group consisting of a pneumatic drive, an hydraulic drive and an electric-motor drive.

15. The apparatus according to claim 8, wherein the apparatus has a plurality of first guiding elements.

* * * * *

UNITED STATES PATENT AND TRADEMARK OFFICE
CERTIFICATE OF CORRECTION

| | | |
|---|---|---|
| PATENT NO. | : 9,090,408 B2 | Page 1 of 1 |
| APPLICATION NO. | : 12/957586 | |
| DATED | : July 28, 2015 | |
| INVENTOR(S) | : Hahn et al. | |

It is certified that error appears in the above-identified patent and that said Letters Patent is hereby corrected as shown below:

Title page, Col. 2, line 5, under FOREIGN PATENT DOCUMENTS, "5/2005" should be --5/2008--.

Signed and Sealed this
Twenty-ninth Day of December, 2015

Michelle K. Lee
*Director of the United States Patent and Trademark Office*